(12) United States Patent
Ito

(10) Patent No.: US 7,385,641 B2
(45) Date of Patent: Jun. 10, 2008

(54) CAMERA ARRANGEMENT WITH MULTIPLE ILLUMINATORS FOR CLOSE IN PHOTOGRAPHY

(75) Inventor: Makoto Ito, Toda (JP)

(73) Assignee: Spyder Navigations, L.L.C., Wilmington, DE (US)

( * ) Notice: Subject to any disclaimer, the term of this patent is extended or adjusted under 35 U.S.C. 154(b) by 749 days.

(21) Appl. No.: 10/447,395

(22) Filed: May 27, 2003

(65) Prior Publication Data

US 2004/0242184 A1 Dec. 2, 2004

(51) Int. Cl.
G03B 15/03 (2006.01)
G03B 15/05 (2006.01)

(52) U.S. Cl. ............... 348/370; 396/61; 396/62

(58) Field of Classification Search ............ 396/61, 396/62; 455/422.1; 348/222.1, 362, 228.1, 348/227.1, 131–132, 135–137, 370, 371, 348/229.1

See application file for complete search history.

(56) References Cited

U.S. PATENT DOCUMENTS

| | | | | |
|---|---|---|---|---|
| 4,772,910 A | * | 9/1988 | Fields | ............... 396/106 |
| 5,016,037 A | * | 5/1991 | Taniguchi et al. | ......... 396/182 |
| 5,023,639 A | * | 6/1991 | Ushiro et al. | ............... 396/61 |
| 5,051,769 A | * | 9/1991 | Hayashi et al. | ............. 396/165 |
| 5,159,379 A | * | 10/1992 | Shirane et al. | ............... 396/62 |
| 5,202,719 A | * | 4/1993 | Taniguchi et al. | ............ 396/61 |
| 5,347,339 A | * | 9/1994 | Terada et al. | ................ 396/62 |
| 5,528,333 A | * | 6/1996 | Lee | ............................ 396/165 |
| 5,649,238 A | * | 7/1997 | Wakabayashi et al. | ........ 396/61 |
| 5,678,073 A | * | 10/1997 | Stephenson et al. | ........ 396/155 |
| 5,708,866 A | * | 1/1998 | Leonard | ..................... 396/62 |
| 5,895,128 A | * | 4/1999 | Kishimoto et al. | ........... 396/61 |
| 6,233,403 B1 | * | 5/2001 | Aratame et al. | ................ 396/6 |
| 6,359,651 B1 | * | 3/2002 | Yokonuma | ................. 348/370 |
| 6,393,274 B1 | * | 5/2002 | Peltonen | .................. 455/414.1 |
| 2002/0191102 A1 | * | 12/2002 | Yuyama et al. | ............. 348/370 |
| 2003/0109232 A1 | * | 6/2003 | Park et al. | ..................... 455/90 |
| 2003/0146986 A1 | * | 8/2003 | Calderwood | ............. 348/240.1 |

* cited by examiner

*Primary Examiner*—Nhan T. Tran
*Assistant Examiner*—Pritham Prabhakher

(57) ABSTRACT

A camera arrangement comprising an illumination assembly for illuminating an object to be photographed by the camera arrangement, the illumination assembly comprising a sensor for sensing the object, first and second illuminators and a controller for controlling the illuminators, wherein the controller is arranged to effect operation only of the first illuminator when the sensor senses the object at a first distance from the camera arrangement, and the controller is arranged to effect operation of at least the second illuminator when the sensor senses the object at a second distance from the camera arrangement.

14 Claims, 2 Drawing Sheets

CAMERA ARRANGEMENT WITH MULTIPLE ILLUMINATORS FOR CLOSE IN PHOTOGRAPHY

FIELD OF THE INVENTION

Embodiments of the present invention relate to camera arrangements for mobile cellular telephone.

BACKGROUND TO THE INVENTION

Mobile phones incorporating cameras are known. Flashes for such cameras can also be incorporated into the phone, but such flashes may not provide suitable illumination when the object is very close to the camera.

BRIEF SUMMARY OF THE INVENTION

According to one aspect of this invention there is provided a camera arrangement comprising a camera lens and an illumination assembly for illuminating an object to be photographed by the camera arrangement, the illumination assembly comprising a sensor for sensing the object, first and second illuminators and a controller for controlling the illuminators, wherein the controller is arranged to effect operation only of the first illuminator when the sensor senses the object at a first distance from the camera lens, and the controller is arranged to effect operation of at least the second illuminator when the sensor senses the object at a second distance from the camera lens.

According to another aspect of this invention, there is provided a mobile phone incorporating a camera arrangement as described in the preceding paragraph.

According to another aspect of this invention there is provided a method of operating a camera arrangement as described above comprising sensing the object and effecting operation on the first illuminator when the object is at a first distance from the camera arrangement or effecting operation of at least the second illuminator when the object is at a second distance from the camera arrangement.

BRIEF DESCRIPTION OF DRAWINGS

An embodiment of the invention will now be described by way of example only, with reference to the accompanying drawings, in which:—

DETAILED DESCRIPTION OF EMBODIMENT(S) OF THE INVENTION

Figure 1:
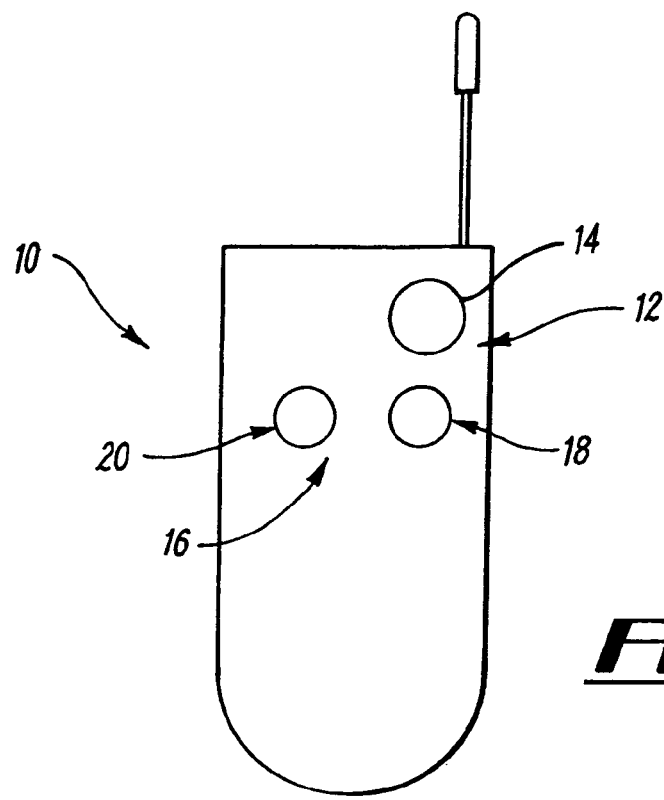
FIG. 1 is a schematic front view of a mobile phone incorporating a camera arrangement in a first mode of operation.
Figure 2:
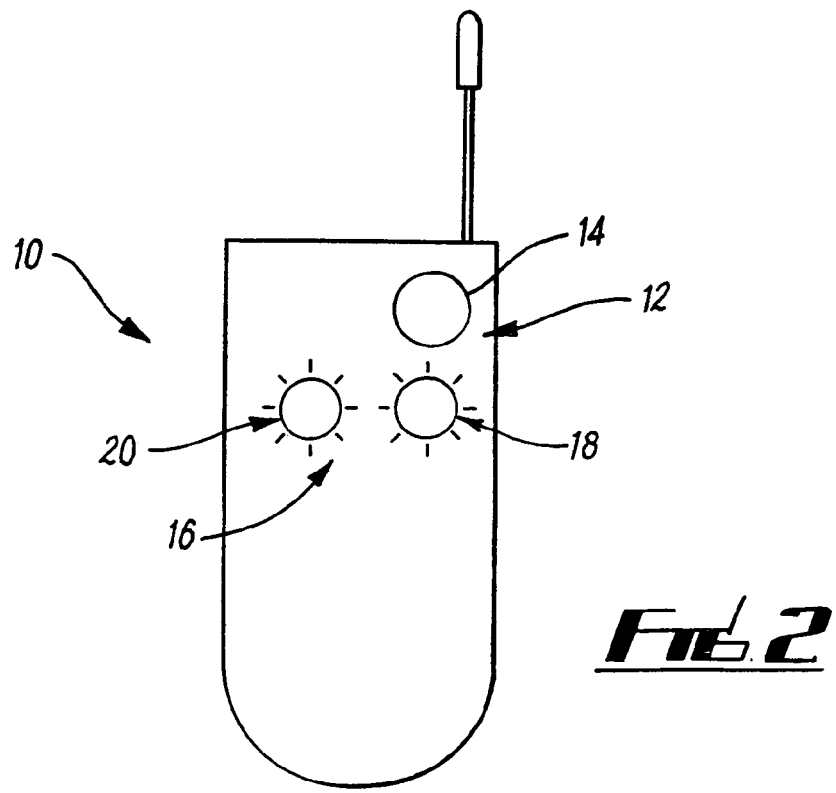
FIG. 2 is a plan view of the mobile phone shown in FIG. 1 in a second mode operation.
Figure 3:
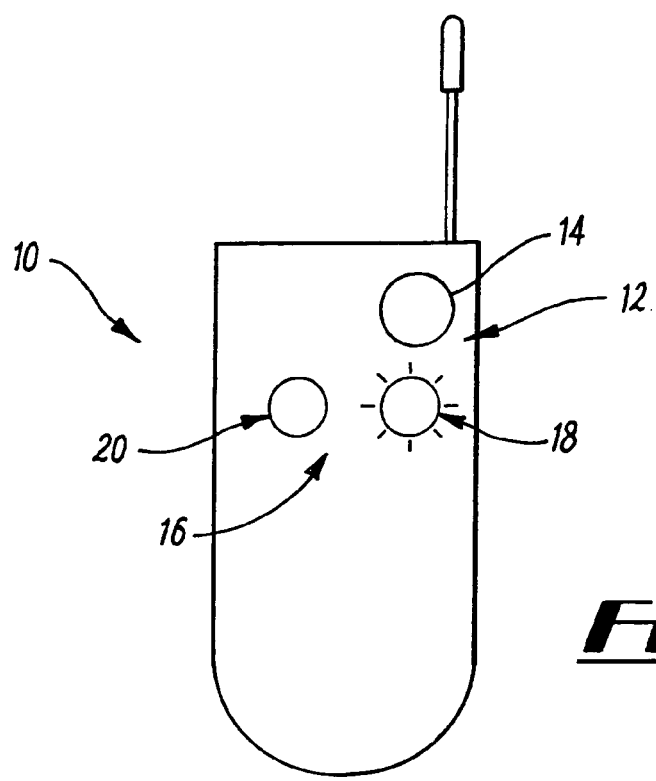
FIG. 3 is a front view of a mobile phone shown in FIG. 1 in a third mode operation.

Referring to the drawings there is shown, in FIGS. 1, 2 and 3, a mobile cellular radio terminal (mobile phone) 10 which comprises all the features commonly associated with a mobile phone as will be understood by the person skilled in the art. These features are not described in this specification for the sake of clarity. In addition to the aforesaid components, the mobile phone 10 also includes a camera arrangement 11. The camera arrangement 11 may, in one illustrated embodiment, be integrated into the mobile phone 10. In other embodiments the camera arrangement may be a module for attachment/detachment with a mobile phone 10. The camera arrangement 10 also includes features of such digital camera arrangements known in the art and, other than the following description, these are not described in this specification.

Figure 4:
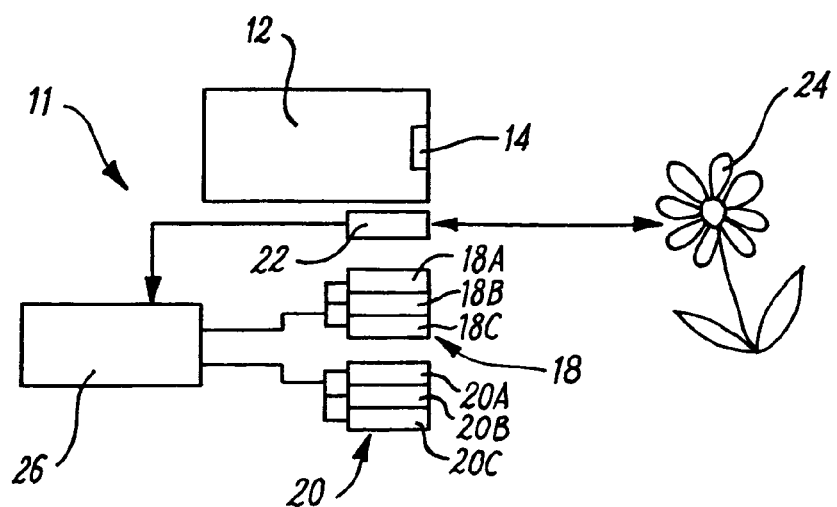
FIG. 4 is a schematic view of a camera and an illumination assembly incorporated into the mobile phone shown in FIG. 1.

The camera arrangement 11 comprises a camera 12 that captures images via a lens 14. The camera arrangement 11 also includes an illumination assembly 16, which is also shown diagrammatically in FIG. 4. The illumination assembly 16 comprises first and second illuminators 18, 20 each of which comprises a plurality of light emitting diodes labelled respectively 18A, 18B, 18C and 20A, 20B, 20C in FIG. 4. The first and second illuminators 18, 20 are arranged to flash under appropriate conditions, as explained below, when a photograph is taken.

The illuminator assembly 16 also includes a sensor 22 for sensing the approximate distance X from the camera lens 14 to an object 24. The sensor 22 also senses ambient brightness.

The illuminator assembly 16 also includes a controller 26 electrically connected to the sensor 22 and to the illuminators 18, 20 for controlling the illuminators 18, 20 in response to signals from the sensor 22.

In operation, when the user wishes to take a photograph using the camera arrangement 11 in the mobile phone 10, the camera lens 14 is directed towards the object 24 which is to be the subject of the photograph. The sensor 22 senses the distance from the camera lens 14 to the object 24. If this distance is greater than 1 meter, the controller 26 effects inoperation of the first and second illuminators 18, 20 such that when the picture is taken with the camera lens 14, the light emitting diodes do not flash.

In the event that the sensor 22 senses that the object 24 is at a distance from the camera lens 14 in the range of ½ meter to 1 meter, the controller 26 effects operation of the first and second illuminators 18, 20 such that both of the first and second illuminators 18, 20 flash when the photograph is taken. This is shown in FIG. 2 in which it can be seen that both of the first and second illuminators 18, 20 are illuminated.

In the event that the user wishes to take a photograph of an object which is at a distance of less than ½ meter from the camera lens 14, such a photograph being known as a macro photograph, the controller 26 is arranged to effect operation of only the first illuminator 18 to illuminate the object 24 as shown in FIG. 3.

It will be appreciated by those skilled in the art that the quality of a photograph can depend not only upon on the distance of the object 24 from the camera 14, but also upon the ambient brightness. This is particularly important when taking macro photographs.

As explained above, the sensor 22 is arranged to sense not only the distance X of the object 24 from the camera 14, but also the ambient brightness. When the user wishes to take a macro photograph, the sensor passes information to the controller relating to the distance X and also to the ambient brightness so that the controller can vary the number of LEDs 18A, 18B, 18C which flash when the photograph is taken. In the event, for example, that the sensor 22 senses that there is minimal ambient brightness, the controller 26 causes all three of the light emitting diodes 18A, 18B, 18C of the illuminator 18 to flash. In the event that the sensor 22 senses high ambient brightness, the controller 26 may cause one or two of the light emitting diodes 18A, 18B, 18C to flash.

In the event that the object 24 is in the range of ½ meter to 1 meter from the camera 14 then the controller will determine how many of the light emitting diodes 18A, 18B, 18C of the illuminator 18 and the light emitting diodes 20A, 20B, 20C of the second illuminator 20 will flash, depending upon the ambient brightness sensed by the sensor 22, in the same way as described above.

As can be seen from FIGS. 1, 2 and 3, the first illuminator 18 is arranged closer to the camera 14 than the second illuminator 20. The reason for this that the first illuminator 18 is used to illuminate the object for macro photographs and, by being the closest to the camera provides the greatest level of illumination.

Various modifications can be made without departing from the spirit and scope of the invention. For example, although in the described embodiment the distance X of an object from the camera arrangement is sensed, in other embodiments the sensor may sense whether an object is close or very close. Although the sensor in the described embodiment is described as separate from the digital camera in other embodiments it may incorporate, or re-use, the sensor circuitry of the digital camera. Although, in the described embodiment the controller 26 is described as separate to the processor within the camera and the processor within the phone, in other embodiments its function may be provided by the camera processor or the mobile phone processor. In addition, the camera arrangement could be used for optical character recognition.

Whilst endeavouring in the foregoing specification to draw attention to those features of the invention believed to be of particular importance it should be understood that the Applicant claims protection in respect of any patentable feature or combination of features herein before referred to and/or shown in the drawings whether or not particular emphasis has been placed thereon.

The invention claimed is:

1. A camera arrangement comprising an illumination assembly for illuminating an object to be photographed by the camera arrangement, the illumination assembly comprising:
    a sensor configured to sense a distance to an object from a camera arrangement, first and second illuminators,
    a camera lens wherein the first illuminator is arranged closer to the camera lens than the second illuminator, and
    a controller configured to control the illuminators, wherein the controller is configured to effect operation only of the first illuminator when the sensed distance is less than a first distance from the camera arrangement, the controller is configured to effect operation of the first illuminator and the second illuminator when the sensed distance is greater than the first distance and less than a second distance from the camera a arrangement, wherein the first distance is less than the second distance, and
    the controller is configured to effect inoperation of the first and the second illuminators when the sensed distance is greater than the second distance.

2. A camera arrangement according to claim 1 wherein the senor is configured to sense ambient brightness and the controller is further configured to control the brightness of at least one of the illuminators based on the sensed distance of the object from the camera arrangement and the sensed ambient brightness.

3. A camera arrangement according to claim 2 wherein the first and second illuminators each comprise a plurality of light emitting diodes, and the controller is further configured to vary the number of light emitting diodes operated based on the sensed ambient brightness and the sensed distance of the object from the camera arrangement.

4. A camera arrangement according to claim 2 wherein the first and second illuminators each comprise a plurality of light sources, and the controller is further configured to vary the number of light sources operated based on the sensed ambient brightness and the sensed distance of the object from the camera arrangement.

5. A mobile phone incorporating a camera arrangement as claimed in claim 1.

6. A method of operating a camera arrangement comprising:
    sensing a distance to an object from a camera arrangement;
    effecting operation only of a first illuminator when the sensed distance to the object is less than a first distance;
    effecting operation of the first illuminator and a second illuminator when the sensed distance to the object is greater than the first distance and less than a second distance; and
    effecting inoperation of both the first and second illuminator when the sensed distance is greater than the second distance,
    wherein the first illuminator is arranged closer to a camera lens of the camera arrangement than the second illuminator, and further wherein the first distance is less than the second distance.

7. A method according to claim 6 wherein the sensor is configured to sense ambient brightness and the controller is further configured to control the brightness of at least one of the illuminators based on the sensed ambient brightness.

8. A method according to claim 7 wherein the first and second illuminators each comprise a plurality of light emitting diodes, and the controller is further configured to vary the number of light emitting diodes operated based on the sensed ambient brightness.

9. An illumination assembly, useable in a camera arrangement, for illuminating an object to be photographed, the illumination assembly comprising:
    a sensor configured to sense a distance to an object from a camera arrangement,
    first and second illuminators, wherein the first illuminator is arranged closer to a camera lens of the camera arrangement than the second illuminator, and
    a controller configured to control the illuminators, wherein the controller is configured to effect operation only of the first illuminator when the sensed distance is less than a first distance, the controller is configured to effect operation of the first illuminator and the second illuminator when the sensed distance is greater than the first distance and less than a second distance, and
    the controller is configured to effect inoperation of both illuminators when the sensed distance is greater than the second distance, the first distance being less than the second distance.

10. An illumination assembly according to claim 9, wherein each of the first and second illuminators comprises a plurality of light sources.

11. An illumination assembly according to claim 9, wherein an intensity of each of the first and second illuminators is capable of being varied.

12. An illumination assembly according to claim 9, further comprising a mobile phone that incorporates the illumination assembly.

13. An illumination assembly according to claim 9 wherein the sensor is further configured to sense ambient brightness and the controller is further configured to control the brightness of at least one of the illuminators based on the sensed ambient brightness.

14. An illumination assembly according to claim 13 wherein the first and second illuminators each comprise a plurality of light emitting diodes, and the controller is further configured to vary the number of light emitting diodes operated based on the sensed ambient brightness.

* * * * *